United States Patent [19]

Bertram et al.

[11] 4,405,766

[45] Sep. 20, 1983

[54] PHOSPHONIUM BICARBONATE CATALYSTS FOR PROMOTING REACTION OF EPOXIDES WITH CARBOXYLIC ACIDS OR ANHYDRIDES

[75] Inventors: James L. Bertram, Lake Jackson, Tex.; George A. Doorakian, Bedford; Lawrence G. Duquette, Maynard, both of Mass.

[73] Assignee: The Dow Chemical Company, Midland, Mich.

[21] Appl. No.: 403,692

[22] Filed: Jul. 30, 1982

[51] Int. Cl.³ .............................................. C08G 59/68
[52] U.S. Cl. ...................................... 525/507; 528/89; 528/99; 528/112; 528/361; 528/408; 560/93; 560/96; 560/112; 560/200; 560/209
[58] Field of Search .................... 525/507; 528/89, 99, 528/112, 361; 560/93, 96, 112, 200, 209

[56] References Cited

U.S. PATENT DOCUMENTS

| | | | |
|---|---|---|---|
| 3,193,529 | 7/1965 | Oxenrider | 260/47 |
| 3,477,990 | 11/1969 | Dante et al. | 528/89 |
| 3,547,885 | 12/1970 | Dante et al. | 528/112 |
| 3,660,354 | 5/1972 | Velzmann | 260/47 EC |
| 3,784,583 | 1/1974 | Smith | 528/89 X |
| 3,948,855 | 4/1976 | Perry | 260/47 EP |

FOREIGN PATENT DOCUMENTS 893191  2/1972  Canada .

Primary Examiner—Earl A. Nielsen
Attorney, Agent, or Firm—M. L. Glenn

[57] ABSTRACT

Tetrahydrocarbyl phosphonium bicarbonate salts are employed as catalysts to promote the reaction between (a) vicinal epoxides and (b) carboxylic acids or anhydrides. These catalysts are particularly useful in the preparation of vinyl ester resins.

7 Claims, No Drawings

PHOSPHONIUM BICARBONATE CATALYSTS FOR PROMOTING REACTION OF EPOXIDES WITH CARBOXYLIC ACIDS OR ANHYDRIDES

BACKGROUND OF THE INVENTION

1. Field of the Invention:

This invention relates to a process for making a polymeric resin by the reaction of an epoxy resin with a carboxylic acid or carboxylic acid anhydride in the presence of a tetrahydrocarbyl phosphonium bicarbonate catalyst.

2. Description of the Prior Art:

It is well known in the art to produce hydroxyl-containing ethers by reacting a vicinal epoxide with a compound bearing phenolic hydroxyls in the presence of such catalysts as tertiary amines, quaternary ammonium halides, phosphonium halides and the like. See, for example: U.S. Pat. Nos. 2,216,099; 2,633,458; 2,658,855; 3,377,406; 3,477,990; 3,547,881; 3,547,885; 3,694,407; 3,738,862; 3,948,855 and 4,048,141; German Pat. DT Nos. 2,206,218 and 2,335,199. The texts, *Handbook of Epoxy Resins* by H. Lee and K. Neville, McGraw-Hill (1967) and *Epoxy Resins Chemistry and Technology*, edited by C. A. May and Y. Tanaka, Marcel Dekker, Inc. (1973), are also of interest. U.S. Pat. No. 4,266,079 and Canadian Pat. No. 893,191 are of particular interest in that they mention the use of phosphonium bicarbonate catalysts to react epoxy resins with phenols.

It is taught in U.S. Pat. No. 4,048,141 that certain other phosphonium salts promote the reaction between vicinal epoxides and phenols and/or carboxylic acids or anhydrides. However, it is also taught therein that it is not possible to predict the activity of an onium catalyst in the reaction of epoxides and carboxylic acids based on its activity in the reaction of epoxides and phenols.

SUMMARY OF THE INVENTION

It has now been discovered that tetrahydrocarbyl phosphonium bicarbonate salts are novel catalysts for promoting the reaction between (a) vicinal epoxides and (b) carboxylic acids or acid anhydrides. These catalysts are surprisingly efficient and active catalysts for the reaction of vicinal epoxides and carboxylic acids or acid anhydrides.

DETAILED DESCRIPTION OF THE INVENTION

Phosphonium Bicarbonate Salts

The tetrahydrocarbyl phosphonium bicarbonate salts correspond to the formula I

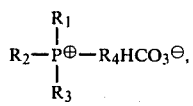

wherein $R_1$, $R_2$, $R_3$ and $R_4$ are each independently hydrocarbyl or inertly-substituted hydrocarbyl radicals, having from 1 to about 20 carbon atoms. The term hydrocarbyl designates a univalent hydrocarbon radical. This hydrocarbyl group can operably bear substituents inert in the catalyzed reaction, for example, alkyl, aryl, alkoxy, hydroxyalkyl moieties and the like. $R_1$, $R_2$, $R_3$ and $R_4$ are preferably each independently $C_1$ to $C_{12}$ alkyl groups or phenyl and more preferably are each independently phenyl or $C_1$ to $C_4$ alkyl. Most preferably, $R_1$–$R_3$ are each n-butyl or each phenyl and $R_4$ is methyl, ethyl or n-butyl.

Compounds of the formula I are conveniently prepared by reacting at room temperature a tetrahydrocarbyl phosphonium halide dissolved in a lower alkanol with an ion-exchange resin (quaternary ammonium hydroxide type), to thereby produce a solution containing the corresponding tetrahydrocarbyl phosphonium hydroxide salt. Carbon dioxide at a positive pressure is then brought into intimate contact with the alkanolic solution of the phosphonium hydroxide salt at room temperature so as to produce the tetrahydrocarbyl phosphonium bicarbonate salt. This salt can be readily recovered by distillation at reduced pressure to remove the solvent.

Illustrative examples of the instant class of catalysts include those of formula I wherein $R_1$–$R_4$ are each ethyl, n-butyl, hexyl, octyl, cyclohexyl, phenyl, benzyl, hydroxymethyl, cyanoethyl, and the like. Other illustrative examples include those of formula I in which $R_1$–$R_4$ are different. For example, those in which $R_1$ is n-butyl and $R_2$–$R_4$ are each phenyl.

Epoxide Reactants

The vicinal epoxide reactants are organic compounds bearing one or more moieties corresponding to the formula

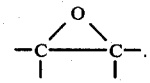

The alkylene oxides of from 2 to about 24 carbon atoms, the epihalohydrins and the epoxy resins are perhaps the best known and most widely used members of the genus. Ethylene oxide, 1,2-propylene oxide, 1,2-butylene oxide and epichlorohydrin are the preferred monoepoxides. These alkylene oxides can be reacted with monohydric phenols to prepare useful alkylene glycol phenyl ethers in the presence of the above-described catalysts. Similarly, monoepoxides can be reacted with carboxylic acids and anhydrides to prepare other useful products.

Polyepoxides are organic compounds possessing more than one 1,2-epoxide group per molecule. The most useful epoxy reactants are these polyepoxides, particularly the epoxy resins. The polyepoxide reactants can operably be saturated or unsaturated, aliphatic, cycloaliphatic, aromatic or heterocyclic in nature. Additionally, the polyepoxides can bear substantially inert substitutents, such as alkoxy, halogen, hydroxyl or phosphorus moieties. They also can be monomeric or polymeric.

Various examples of polyepoxides that may be used in the invention are given in U.S. Pat. No. 2,633,458 and the relevant portions of that patent incorporated by reference into this specification. The polyepoxides, particularly the polymeric type, are conveniently described in terms of epoxy equivalent values, as defined in U.S. Pat. No. 2,633,458. The polyepoxides used in the subject advancement reaction are those having an epoxy equivalency greater than 1.0.

Other examples of polyepoxides include the glycidyl ethers of novolac resins, i.e., phenol-formaldehyde condensates. Preferred resins of this type are those of the formula:

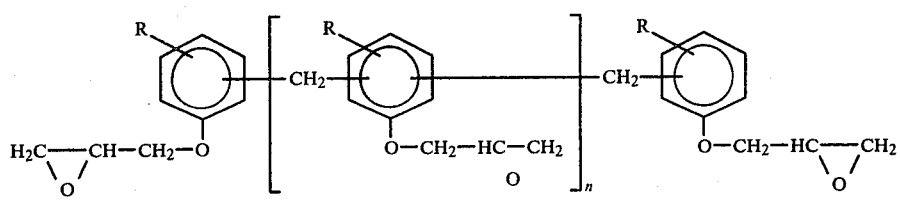

wherein each R independently is hydrogen or an alkyl radical and n has an average value of from about 0.1 to about 10, preferably from about 1 to about 2. Preparation of these polyepoxides is illustrated in U.S. Pat No. 2,616,099 and U.S. Pat. No. 2,658,885.

The preferred polyepoxides are those represented by the general formula

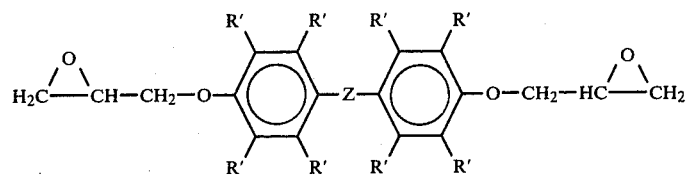

wherein R' at each occurrence is independently selected from hydrogen, bromine and chlorine and wherein Z is selected from oxygen, sulfur, —SO—, —SO$_2$—, bivalent hydrocarbon radicals containing up to about 10 carbon atoms, oxygen-, sulfur- and nitrogen-containing hydrocarbon radicals, such as —O—R''—O—, —OR''—O—R''—O—, —S—R''—S—, or

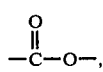

wherein R'' is a bivalent hydrocarbon radical. In formula III, Z preferably is an alkylene or alkylidine group having from about 1 to about 4 carbon atoms and is most peferably methylene (—CH$_2$—) or isopropylidine (—C(CH$_3$)$_2$—).

Other examples of polyepoxides include the epoxidized esters of the polyethylenically unsaturated monocarboxylic acids, such as epoxidized linseed, soybean, tung, walnut and dehydrated castor oil, methyl linoleate, butyl linoleate, ethyl 9,12-octadecanedioate, butyl 9,12,15-octadecanetrioate, butyl oleostearate, mono- or diglycerides of tung oil, monoglycerides of soybean oil, sunflower oil, rapeseed oil, hempseed oil, sardine oil, cottonseed oil, and the like.

Another group of the epoxy-containing materials suitable for use in the process of this invention include the epoxidized esters of unsaturated monohydric alcohols and polycarboxylic acids, such as, for example, diglycidyl phthalate, diglycidyl adipate, diglycidyl isophthalate, di(2,3-epoxybutyl)adipate, di(2,3-epoxybutyl)oxalate, di(2,3-epoxyhexyl)succinate, di(3,4-epoxybutyl)maleate, (di(2,3-epoxyoctyl)pimelate, di(2,3-epoxybutyl)phthalate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(5,6-epoxytetradecyl)diphenyldicarboxylate, di(3,4-epoxyheptyl)sulfonyldibutyrate, tri(2,3-epoxybutyl)1,2,4-butanetricarboxylate, di(5,6-epoxypentadecyl)tartrate, di(4,5-epoxytetradecyl)maleate, di(2,3-epoxybutyl)azelate, di(3,4-epoxybutyl)citrate, di(5,6epoxyoctyl)cyclohexane-1,3-dicarboxylate, di(4,5-epoxyoctadecyl)malonate.

Another group of the epoxy-containing materials include epoxidized esters of unsaturated alcohols and unsaturated carboxylic acids, such as 2,3-epoxybutyl 3,4-epoxypentanoate; 3,4-epoxyhexyl 3,4-epoxypentanoate; 3,4-epoxy-6-methylcyclohexylmethyl 3,4-epoxy-6-methyl-cyclohexane carboxylate.

Still another group of the epoxy-containing materials includes epoxidized derivatives of polyethylenically unsaturated polycarboxylic acids, such as, for example, dimethyl 8,9,12,13-diepoxyeicosanedioate; dibutyl 7,8,11,12-diepoxyoctadecanedioate; dioctyl 10,11-diethyl-8,9,12,13-diepoxyeicosanedioate; dihexyl 6,7,10,11-diepoxyhexadecanedioate; didecyl 9-epoxyethyl-10,11-epoxyoctadecanedioate; dibutyl 3-butyl-3,4,5,6-diepoxycyclohexane-1,2-dicarboxylate; dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

The Carboxylic Acid Reactants

The organic carboxylic acids and anhydrides employed as reactants are a well known class of compounds. These acids comprise an organic group bearing one or more carboxyl groups. The anhydrides are prepared from such carboxylic acids by the removal of water therefrom in an intra- or intermolecular condensation. This class of compounds therefore includes acetic, propionic, octanoic, stearic, acrylic, methacrylic, oleic, benzoic, phthalic, isophthalic, maleic, succinic, adipic, itaconic, hexahydrophthalic acid and polymethacrylic acids, and the like, and anhydrides thereof, such as acetic anhydride, phthalic anhydride, hexahydrophthalic anhydride, etc.

A preferred subclass of acids is comprised of members which are useful in cross-linking epoxy resins. The members of this subclass are normally di- or tribasic acids, or anhydrides thereof, and are preferably liquid or low melting solids such as succinic, maleic, or hexahydrophthalic acids or anhydrides, and the like. Other such acids and anhydrides are shown, for example, in U.S. Pat. Nos. 2,970,983 and 3,547,885, which are incorporated herein by reference.

Process for Reacting Epoxide and Acid or Anhydride

The general reaction conditions employed in the process of the present invention for reacting the epoxide with a carboxylic acid or anhydride in the presence of a catalyst are well known and include temperatures of from about 50° C. to about 300° C. at pressures ranging from about atmospheric to about 150 pounds per square inch gauge (psig).

The amount of the epoxide and carboxylic acid or anhydride to be employed in the process may vary over a wide range depending upon the type of reactants and the type of product desired. For example, if a cross-linked product is desired, one would employ a suitable amount of a di- or trifunctional acid or anhydride.

The amount of the phosphonium bicarbonate catalyst employed in the process of this invention can operably vary over a wide range, but of course a catalytic amount is employed. In general, the amount of catalyst can vary from about 0.001 percent to about 10 percent, preferably from about 0.01 percent to about 5 percent, by weight of the reactants. The minimum effective quantity of catalyst will depend upon the reactants, the identity of the catalysts and the reaction conditions.

The reaction may be conducted in the presence or absence of solvents or diluents. In most cases, the reactants will be liquid and the reaction can be easily effected initially without the addition of solvents or diluents. As the advancement reaction proceeds and the average molecular weight of the product increases, the reaction mixture becomes progressively more viscous and may solidify. To maintain efficient blending of the reaction mixture, it may be necessary to add diluents, increase the temperature of the reaction mixture to the fusion point of the reactants or to utilize very efficient mechanical blending means. Suitable diluents are those organic compounds which are inert to the reactants and are liquids at the reaction temperature. Suitable diluents include ethylene glycol ethyl ether, methyl ethyl ketone, acetone, xylene, toluene, cyclohexane and the like. Desirably, the diluent is substantially free of impurities which will decrease the activity of the catalyst, such as hydrogen peroxide or uncomplexed transition metal ions.

If solvents are employed in the reaction and the resulting product is to be used for coating purposes, the solvent can be retained in the reaction mixture. Otherwise, the solvent can be removed by any suitable method, such as by distillation.

Advancement Reaction Products

The high molecular weight reaction products produced herein are useful in preparing surface coatings, adhesives, laminates, filament windings, coatings for highways and airfields, structural applications, formation of foams and the like. Those prepared from the halogenated polyhydric phenols as shown hereinafter are particularly useful as flameproofing resins for forming laminates, coatings and the like. Other utilities for these materials are mentioned in U.S. Pat. No. 4,048,141, which is incorporated herein by reference.

The subject reaction can be used to prepare vinyl ester resins. Vinyl ester resins are described in U.S. Pat. No. 3,367,992 wherein dicarboxylic acid half esters of hydroxyalkyl acrylates or methacrylates are reacted with polyepoxide resins. Bowen in U.S. Pat. Nos. 3,066,112 and 3,179,623 describes the preparation of vinyl ester resins from unsaturated monocarboxylic acids such as acrylic and methacrylic acid. Vinyl ester resins based on epoxy novolac resins are described in U.S. Pat. No. 3,301,743 issued to Fekete et al. Fekete et al also describe U.S. Pat. No. 3,256,226 vinyl ester resins wherein the molecular weight of the polyepoxide is increased by reacting a dicarboxylic acid with the polyepoxide resin as well as acrylic acid, etc. Other difunctional compounds containing a group which is reactive with an epoxide group, such as an amine, mercaptan, and the like, may be utilized in place of the dicarboxylic acid to build molecular weight or cross-link the resins. All of the above-described resins, which contain the characteristic linkages

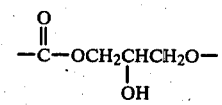

and terminal, polymerizable vinyl or vinylidene moieties are classified as vinyl ester resins. The aforementioned patents which describe vinyl ester resins are incorporated herein by reference.

The unsaturated monocarboxylic acids which can be reacted with a polyepoxide in the presence of the described catalysts to prepare a vinyl ester resin include acrylic acid, methacrylic acid, halogenated acrylic acid or methacrylic acid, cinnamic acid and the like and mixtures thereof, and hydroxyalkyl acrylate or methacrylate half esters of dicarboxylic acids as described in U.S. Pat. No. 3,367,992 wherein the hydroxyalkyl group preferably has from 2 to 6 carbon atoms.

EXAMPLE 1

Preparation of $(N-C_4H_9)_3 \oplus PCH_3 \, HCO_3 \ominus$

A solution of 100 grams of tri(n-butyl)methyl phosphonium bromide salt in 40 grams of methanol is percolated through a tightly packed column of 509 grams of a quaternary ammonium-type, styrene divinylbenzene anion exchange resin (sold under the tradename DOWEX SBR) bearing 3.5 milliequivalents per gram of exchangeable hydroxide groups. The methanol solution is found by conventional methods of analysis to contain 17 percent of tri(n-butyl)methyl phosphonium hydroxide salt and containing only 0.05 percent bromine.

To the methanol solution of

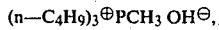

6.07 gram of water is added with stirring at room temperature. Gaseous carbon dioxide is then sparged through the solution until 14.85 grams have been absorbed. After stirring the solution for one hour, the methanol solvent is then distilled under reduced pressure to yield 92.7 grams of a colorless crystalline solid. Conventional methods of analysis (infrared spectroscopy, proton and phosphorus nuclear magnetic resonance) are utilized to identify the product as tri(n-butyl)methyl phosphonium bicarbonate salt. The yield of this product based on the corresponding bromide is 99.0 mole percent. The conversion of hydroxide to bromide is 99.7 mole percent.

EXAMPLE 2

Preparation of $(phenyl)_3 \oplus PCH_3 \, HCO_3 \ominus$

In a manner otherwise similar to Example 1, a methanol solution of triphenyl methyl phosphonium bromide salt is used to prepare the corresponding bicarbonate salt. The yield of the tri(phenyl)methyl phosphonium bicarbonate salt is 99 mole percent based on the corresponding bromide salt.

EXAMPLE 3

To a reaction vessel equipped with means for stirring and temperature indication is charged 10.0 grams of the diglycidyl ether of bisphenol A (DGEBA) having an epoxy equivalent weight of 187, 8.0 grams of hexahydrophthalic anhydride and 0.03 gram of tri-n-butyl methyl phosphonium bicarbonate salt at 20° C. The reaction mixture is heated at 110° C. for 2 hours and an additional 2 hours at 150° C. to yield a hard, colorless, cross-linked product.

EXAMPLE 4

In an otherwise similar manner to Example 10, 0.02 gram of triphenyl methyl phosphonium bicarbonate salt is employed to catalyze the reaction between DGEBA and hexahydrophthalic anhydride. A hard, colorless cross-linked product results.

EXAMPLE 5

To a reaction vessel equipped with means for stirring and temperature indication is charged at 20° C. under nitrogen purge, 10.3 grams (0.05 mole) of 4-t-butylphenyl glycidyl ether, 3.6 grams (0.05 mole) of acrylic acid and 0.07 gram of the tri-n-butyl methyl phosphonium bicarbonate salt. The reaction mixture is stirred at a temperature of 115° C. for a period of five hours. The reaction mixture is titrated with base at the end of the reaction period and less than 1 percent of the acrylic acid added is determined to be unreacted. Infrared spectroscopy and other conventional methods of analysis are utilized to determine a 95 percent yield of the product corresponding to the formula

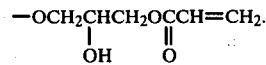

In contrast, only a 29 percent yield of product is obtained in a similar experiment conducted without the catalyst. This example demonstrates the efficacy of the tetrahydrocarbyl phosphonium bicarbonate salt in promoting the reaction of a carboxylic acid with an epoxide.

EXAMPLE 6

To a reaction vessel equipped with means for stirring and temperature indication is charged at 20° C. 423.9 grams of DGEBA having an epoxy equivalent weight of 188.73 and 136.7 grams of bisphenol A. The reaction mixture is heated to 70° C. and then 0.25 gram of n-butyl triphenyl phosphonium bicarbonate salt is introduced with stirring. The mixture is rapidly heated to 90° C. and then more slowly over a period of 30 minutes is heated to 150° C. The reaction mixture is maintained at 150° C. for 1.5 hours and then allowed to cool. Another 143.23 grams of DGEBA is added to the reaction mixture at a temperature of 120° C. After 10 minutes, a small sample of the reaction mixture is analyzed by conventional methods to determine an epoxide content of 8.10 percent. Thus, the epoxy resin has been partially advanced.

The partially advanced epoxy resin product is purged with air and then combined with 0.19 gram hydroquinone (a vinyl polymerization inhibitor), 155.81 grams methacrylic acid and 1.15 grams tris(dimethylaminomethyl) phenol (a curing accelerator) at 115° C. After 5.3 hours, a sample of the vinyl ester resin is taken and 856 grams of styrene is introduced to the remaining vinyl ester resin to reduce the viscosity of the product mixture. Analysis of the sample of vinyl ester resin product by conventional methods indicates an acid content of 0.86 percent and an epoxide content of 0.60 percent.

The styrene/vinyl ester resin mixture is cured at a temperature of approximately 75° C. in the presence of cobalt naphthenate and methyl ethyl ketone peroxide in the conventional manner. The cured vinyl ester resin-styrene copolymer possesses the physical properties tabulated in Table I.

TABLE I

| ASTM Test # | Property Tested | Test Result |
|---|---|---|
| D-638-68 | Yield Tensile Strength | 11,734 psi |
| D-638-68 | Elongation | 5.37% |
| D-790-66 Method | Flexural Strength | 21,638 psi |
| D-790-66 Method | Flexural Modulus of Elasticity | 537,000 psi |
| D-2583-67 | Barcol Hardness | 37.0 |

It is apparent from the data tabulated in Table I that the vinyl ester resins produced from epoxy resins advanced with the catalysts of this invention possess useful properties.

What is claimed is:

1. In the process of reacting
   (a) a vicinal epoxy-containing material with
   (b) carboxylic acid or anhydride
the improvement comprising conducting the reaction in the presence of a catalytic amount of a compound represented by the formula

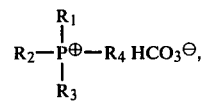

wherein $R_1$–$R_4$ each independently is hydrocarbyl or intertly-substituted hydrocarbyl radical, having from 1 to about 20 carbon atoms.

2. The process as described in claim 1 wherein $R_1$–$R_4$ each independently is phenyl or $C_1$ to $C_{12}$ alkyl or inertly-substituted $C_1$ to $C_{12}$ alkyl.

3. The process as described in claim 1 wherein $R_1$–$R_4$ each independently is phenyl or $C_1$ to $C_4$ alkyl.

4. The process as described in claim 1 wherein $R_1$–$R_3$ are each phenyl and $R_4$ is n-butyl.

5. The process as described in claim 1 wherein $R_1$–$R_3$ are each phenyl or n-butyl and $R_4$ is methyl, ethyl or n-butyl.

6. The process as described in claim 1 wherein $R_1$–$R_3$ are each phenyl and $R_4$ is ethyl.

7. The process as described in claim 1 wherein $R_1$–$R_3$ are each n-butyl and $R_4$ is methyl.

* * * * *